US008575510B2

(12) United States Patent
Laurisch et al.

(10) Patent No.: US 8,575,510 B2
(45) Date of Patent: Nov. 5, 2013

(54) NOZZLE FOR A LIQUID-COOLED PLASMA BURNER, ARRANGEMENT THEREOF WITH A NOZZLE CAP, AND LIQUID-COOLED PLASMA BURNER COMPRISING SUCH AN ARRANGEMENT

(75) Inventors: Frank Laurisch, Finsterwalde (DE); Volker Krink, Finsterwalde (DE); Timo Grundke, Finsterwalde (DE); Ralf-Peter Reinke, Finsterwalde (DE)

(73) Assignee: Kjellberg Finsterwalde Plasma und Maschinen GmbH, Finsterwalde (DE)

( * ) Notice: Subject to any disclaimer, the term of this patent is extended or adjusted under 35 U.S.C. 154(b) by 0 days.

(21) Appl. No.: 12/937,172

(22) PCT Filed: Mar. 23, 2009

(86) PCT No.: PCT/DE2009/000395

§ 371 (c)(1),
(2), (4) Date: Jan. 14, 2011

(87) PCT Pub. No.: WO2009/124524

PCT Pub. Date: Oct. 15, 2009

(65) Prior Publication Data

US 2011/0108528 A1 May 12, 2011

(30) Foreign Application Priority Data

Apr. 8, 2008 (DE) ......................... 10 2008 018 530

(51) Int. Cl.
*B23K 10/00* (2006.01)

(52) U.S. Cl.
USPC .............. 219/121.5; 219/121.49; 219/121.48; 219/121.51

(58) Field of Classification Search
CPC ........................................................ B23K 10/00
USPC ............... 219/121.48, 121.49, 121.5, 121.51, 219/121.52, 74, 75; 313/231.31, 231.41, 313/231.51
See application file for complete search history.

(56) References Cited

U.S. PATENT DOCUMENTS

| | | | | |
|---|---|---|---|---|
| 3,756,511 A | | 9/1973 | Shinroku et al. | 239/132.3 |
| 3,851,824 A | | 12/1974 | Svensson | 239/132.3 |
| 4,236,059 A | | 11/1980 | McComas et al. | 219/121 |
| 4,919,334 A | | 4/1990 | Hartmann et al. | 239/600 |
| 5,208,448 A | * | 5/1993 | Everett | 219/121.5 |
| 5,396,043 A | * | 3/1995 | Couch et al. | 219/121.5 |

(Continued)

FOREIGN PATENT DOCUMENTS

| | | |
|---|---|---|
| DE | 82105656.1 | 6/1982 |
| DE | 8132660.2 | 4/1983 |

(Continued)

*Primary Examiner* — Mark Paschall
(74) *Attorney, Agent, or Firm* — McDonald, Illig, Jones & Britton LLP; Jon L. Woodard

(57) ABSTRACT

The invention relates to a liquid-cooled plasma burner, comprising a nozzle bore for the plasma gas jet to exit at a nozzle tip and a first section whose outer surface gradually tapers in the shape of a cone at an angle α in the direction of the nozzle tip, except for at least one deflection section that extends in the shape of a cone at an angle β in the direction of the nozzle tip. The invention also relates to an arrangement thereof with a nozzle cap and to a plasma burner comprising such an arrangement.

25 Claims, 19 Drawing Sheets

(56) References Cited

U.S. PATENT DOCUMENTS

| | | | | |
|---|---|---|---|---|
| 5,624,586 | A | 4/1997 | Sobr et al. ................ | 219/121.48 |
| 5,856,647 | A | 1/1999 | Luo ............................ | 219/121.5 |
| 6,169,264 | B1 | 1/2001 | Marhic ...................... | 219/121.5 |
| 6,534,747 | B1 | 3/2003 | Rehrig ..................... | 219/137.31 |
| 7,005,600 | B2 * | 2/2006 | Conway et al. ............ | 219/121.5 |
| 7,132,619 | B2 * | 11/2006 | Conway et al. .......... | 219/121.52 |

FOREIGN PATENT DOCUMENTS

| | | | |
|---|---|---|---|
| DE | 8425168.9 | | 11/1984 |
| DE | 69511728 | T2 | 1/2000 |
| WO | WO 92/00658 | | 1/1992 |
| WO | WO96/21338 | | 7/1996 |
| WO | WO 01/98013 | A1 | 12/2001 |
| WO | WO/2005/057994 | A1 | 6/2005 |
| WO | WO/2008/019661 | A2 | 2/2008 |

* cited by examiner a1 = 3,4
b1 = 1,8

$\alpha$ = 33°
$\beta$ = $\alpha$ = 33°
$\gamma$ = 180°−$\alpha$/2−$\beta$/2
$\gamma$ = 147°
$\delta$ = 90°

NOZZLE FOR A LIQUID-COOLED PLASMA BURNER, ARRANGEMENT THEREOF WITH A NOZZLE CAP, AND LIQUID-COOLED PLASMA BURNER COMPRISING SUCH AN ARRANGEMENT

The present invention relates to plasma burners. More particularly, the present invention relates to a nozzle and a nozzle cap for liquid-cooled plasma burners.

BACKGROUND

A plasma is the term used for an electrically conductive gas consisting of positive and negative ions, electrons and excited and neutral atoms and molecules which is heated thermalbly to a high temperature.

Various gases are used as plasma gases, such as monoatomic argon and/or the diatomic gases hydrogen, nitrogen, oxygen or air. These gases are ionised and dissociated by the energy of an electric arc. The electric arc is constricted by a nozzle and is then referred to as a plasma jet.

The parameters of the plasma jet can be heavily influenced by the design of the nozzle and the electrode. These parameters of the plasma jet are, for example, the diameter of the jet, the temperature, the energy density and the flow rate of the gas.

In plasma cutting, for example, the plasma is constricted by a nozzle, which can be cooled by gas or water. In this way, energy densities of up to $2\times10^6$ W/cm$^2$ can be obtained. Temperatures of up to 30,000° C. arise in the plasma jet, which, in combination with the high flow rate of the gas, make it possible to achieve very high cutting speeds on materials.

Plasma burners can be operated directly or indirectly. In the direct operating mode, the current flows from the source of the current, through the electrode of the plasma burner and the plasma jet generated by the electric arc and constricted by the nozzle, directly back to the source of the current via the workpiece. The direct operating mode can be used to cut electrically conductive materials.

In the indirect operating mode, the current flows from the current source, through the electrode of the plasma burner and the plasma jet generated by the electric arc and constricted by the nozzle, and back to the source of the current via the nozzle. In the process, the nozzle is subjected to an even greater load than in direct plasma cutting, since it not only constricts the plasma jet, but also establishes the attachment spot for the electric arc. With the indirect operating mode, both electrically conductive and non-conductive materials can be cut.

Because of the high thermal stress on the nozzle, it is usually made from a metallic material, preferably copper, because of its high electrical conductivity and thermal conductivity. The same is true of the electrode holder, though it may also be made of silver. The nozzle is then inserted in a plasma burner, the main elements of which are a plasma burner head, a nozzle cap, a plasma gas conducting member, a nozzle, a nozzle holder, an electrode quill, an electrode holder with an electrode insert and, in modern plasma burners, a bracket for a nozzle protection cap and a nozzle protection cap. The electrode holder fixes a pointed electrode insert made from tungsten, which is suitable when non-oxidising gases are used as the plasma gas, such as a mixture of argon and hydrogen. A flat-tip electrode, the electrode insert of which is made of hafnium, is also suitable when oxidising gases are used as the plasma gas, such as air or oxygen. In order to achieve a long service life for the nozzle, it is in this case cooled with a fluid, such as water. The coolant is delivered to the nozzle via a water supply line and removed from the nozzle via a water return line and in the process flows through a coolant chamber, which is delimited by the nozzle and the nozzle cap.

DD 36014 B1 describes a nozzle. It consists of a material with good conductive properties, such as copper, and has a geometrical shape associated with the plasma burner type concerned, such as a conically shaped discharge space with a cylindrical nozzle outlet. The outer shape of the nozzle is designed as a cone, formed with an approximately uniform wall thickness, which is dimensioned such that good stability of the nozzle and good conduction of the heat to the coolant is ensured. The nozzle is located in a nozzle holder. The nozzle holder consists of a corrosion-resistant material, such as brass, and has on the inside a centring mount for the nozzle and a groove for a rubber seal, which seals the discharge space against the coolant. In the nozzle holder, there are in addition bores offset by 180° for the coolant supply and return lines. On the outer diameter of the nozzle holder there is a groove for an O-ring for sealing the coolant chamber against the atmosphere and a thread and a centring mount for a nozzle cap. The nozzle cap, likewise made of corrosion-resistant material, such as brass, is shaped with an acute angle and has a wall thickness designed to make it suitable for dissipating radiant heat to the coolant. The smallest internal diameter is provided with an O-ring. For a coolant, it is simplest to use water. This arrangement is intended to facilitate the manufacture of the nozzles, whilst making sparing use of materials, and to make it possible to replace the nozzles quickly and also to swivel the plasma burner relative to the workpiece thanks to the acute-angled shape, thus enabling slanting cuts.

In the published patent application DE-OS 1 565 638 there is described a plasma burner, preferably for plasma arc cutting of materials and for welding edge preparation. The slender shape of the torch head is achieved by using a particularly acute-angled cutting nozzle, the internal and external angles of which are identical to one another and also identical to the internal and external angles of the nozzle cap. Between the nozzle cap and the cutting nozzle, a chamber is formed for coolant, in which the nozzle cap is provided with a collar, which establishes a metallic seal with the cutting nozzle, so that in this way a uniform annular gap is formed as the coolant chamber. The coolant, generally water, is supplied and removed via two slots in the nozzle holder arranged so as to be offset by 180° to one another.

In DE 25 25 939, a plasma arc torch, especially for cutting or welding, is described, in which the electrode holder and the nozzle body form an exchangeable unit. The external coolant supply is formed substantially by a coupling cap surrounding the nozzle body. The coolant flows through channels into an annular space formed by the nozzle body and the coupling cap.

DE 692 33 071 T2 relates to an electric arc plasma cutting apparatus. It describes an embodiment of a nozzle for a plasma arc cutting torch formed from a conductive material and having an outlet opening for a plasma gas jet and a hollow body section designed such that it has a generally conical thin-walled configuration which is slanted towards the outlet opening and has an enlarged head section formed integrally with the body section, the head section being solid, except for a central channel, which is aligned with the outlet opening and has a generally conical outer surface, which is also slanted towards the outlet opening and has a diameter adjacent to that of the neighbouring body section which exceeds the diameter of the body section, in order to form a cutback recess. The electric arc plasma cutting apparatus possesses a secondary gas cap. In addition, there is a water-cooled cap disposed between the nozzle and the secondary gas cap in order to form a water-cooled chamber for the external surface of the nozzle for a highly efficient cooler. The nozzle is characterised by a large head, which surrounds an outlet opening for the plasma jet, and a sharp undercut or recess to a conical body. This nozzle construction assists cooling of the nozzle.

In the plasma burners described above, the coolant is supplied to the nozzle via a water flow channel and removed from the nozzle via a water return channel. These channels are usually offset from one another by 180°, and the coolant is supposed to flow round the nozzle as uniformly as possible on the way from the supply line to the return line. Nevertheless, overheating is repeatedly found in the vicinity of the nozzle channel.

A different coolant flow for a burner, preferably a plasma burner, especially for plasma welding, plasma cutting, plasma fusion and plasma spraying purposes, which can withstand the high thermal loads in the nozzle and the cathode is described in DD 83890 B1. In this case, for cooling the nozzle, a cooling medium guide ring which can easily be inserted into and removed from the nozzle holding part is provided, which has a peripheral shaped groove to restrict the cooling medium flow to a thin layer no more than 3 mm thick along the outer nozzle wall. More than one, preferably two to four, coolant lines arranged in a star shape relative to the shaped groove and radially and symmetrically to the nozzle axis and in a star shape relative to the latter are provided at an angle of between 0 and 90° and lead into the shaped groove in such a way that they each have two cooling medium outlets next to them and each cooling medium outlet has two cooling medium inlets next to it.

This arrangement for its part suffers from the disadvantage that greater effort is required for the cooling, because of the use of an additional component, the cooling medium guide ring. Furthermore, the entire arrangement becomes bigger as a result.

BRIEF SUMMARY

The preferred embodiments of the invention consider the problem of avoiding overheating in the vicinity of the nozzle channel or the nozzle bore in a simple manner.

This problem is addressed in the preferred embodiments of the invention by a nozzle for a liquid-cooled plasma burner, comprising a nozzle bore for the exit of a plasma gas jet at a nozzle tip and a first section, the outer surface of which tapers in the shape of a cone at an angle $\alpha$ in the direction of the nozzle tip, except for at least one deflection section that extends in the shape of a cone at a respective angle $\beta$1, $\beta$2 in the direction of the nozzle tip. At least in a particular embodiment, the deflection section in the direction of the nozzle tip is located before the narrowest part or the narrowest region of the nozzle bore.

It may be contemplated in this context that the angle $\alpha$ is in the range from 20° to 120°. Even more preferably, it is in the range from 30° to 90°.

It may advantageously be provided that the angle $\beta$1, $\beta$2 is in the range from 20° to 120°. Even more preferably, it is in the range from 30° to 90°.

According to a further particular embodiment of the invention, a plurality of deflection sections may be provided, and deflection sections may extend in the shape of a cone at the same angle $\beta$1 or $\beta$2.

On the other hand, it is also conceivable that more than one deflection section are provided and at least two of the deflection sections extend in the shape of a cone at different angles $\beta$1, $\beta$2.

It is advantageous for the angles $\alpha$ and $\beta$1 or $\beta$2 to differ in their values by a maximum of 30°.

On the other hand, it is also conceivable that the angles $\alpha$ and $\beta$1 or $\beta$2 are equal in their value.

According to a further particular embodiment of the invention, it can be provided that an angle $\gamma$, which is formed by the outer surface of the first section tapering in the shape of a cone and the outer surface of the or one of the deflection section(s) extending in the shape of a cone is between 60° and 160°. Even more preferably, it is in the range from 100°-150°.

In addition, it can conveniently be provided that an angle $\delta$, which is formed by a front edge towards the nozzle tip of the or one of the deflection section(s) and the centre axis of the nozzle, is between 75° and 105°.

In particular, the angle $\delta$ is preferably 90°.

It is convenient for the length or lengths of the deflection section(s) running parallel to the centre axis of the nozzle to be within the range from 1 to 3 mm.

In particular, it can be provided that the lengths of the deflection section(s) running parallel to the centre axis of the nozzle are the same size.

According to a further particular embodiment of the invention, it can be provided that the length or lengths of the deflection section(s) running perpendicular to the centre axis of the nozzle is/are within the range from 1 to 4 mm.

In particular can be provided that the lengths of the deflection section(s) running perpendicular to the centre axis of the nozzle are the same size.

It is advantageous for the nozzle to have a second section with a cylindrical outer surface for receiving in a burner mounting bracket.

It is convenient for the nozzle to have a third section with a substantially cylindrical outer surface, which is located immediately before the nozzle bore relative to the centre axis of the nozzle.

It is advantageous for the nozzle to have a third section with a substantially cylindrical outer surface, which is located at least partially opposite the nozzle bore relative to the centre axis of the nozzle.

In addition, there may be a groove for an O-ring located in the vicinity of the nozzle tip.

In a particular embodiment of the invention, a nozzle and a nozzle cap form a coolant chamber in fluid communication with a coolant supply line and a coolant return line, and the nozzle cap has, at least in the region of the first section of the nozzle, an internal surface tapering in the shape of a cone in the direction of the nozzle tip.

It is convenient for the area of the circular annular surface of the coolant chamber to reduce in the direction of the nozzle tip along the centre axis of the nozzle in the at least one deflection section 1.5 to 8 times more quickly than before the at least one deflection section.

In addition, the area of the circular annular surface of the coolant chamber in the direction of the nozzle tip along the centre axis of the nozzle immediately after the at least one deflection section is 1.5 to 8 times larger than the smallest area of the deflection section.

Additionally, it is conceivable that the circular annular surface of the coolant chamber in the direction of the nozzle tip along the centre axis of the nozzle immediately after the at least one deflection section jumps at least to the value it has immediately before the deflection section.

In a particular embodiment of the invention, the coolant supply line and the coolant return line are offset by 180° relative to one another.

In a particular embodiment of the invention, a liquid-cooled plasma burner comprises a coolant supply line and a coolant return line with an arrangement of a nozzle and nozzle cap discussed in the preceding paragraphs.

In one particular embodiment, the plasma burner has not only a plasma gas supply line, but also a secondary gas supply line and a nozzle cover guard.

The preferred embodiments of the invention are based on the surprising realization that by providing at least one deflection section, the nozzle is supplied in a simple manner with coolant flowing round it more uniformly than hitherto, which also means that coolant reaches the vicinity of the nozzle bore to a greater extent and/or that the flow rate of the coolant in the vicinity of the nozzle bore is enhanced. No additional component is needed to improve the cooling in order to increase the service life of the nozzle. Furthermore, this can be achieved with a small structural design of the plasma burner. Moreover, the nozzle can be exchanged simply and rapidly in this way. In addition, the plasma burner remains sufficiently acute-angled.

Further features and advantage of the particular embodiments of the invention will become clear from the attached claims and the following description, in which a number of particular embodiments of the invention are illustrated in detail with reference to the schematic drawings. There,

DESCRIPTION OF THE PREFERRED EMBODIMENTS

Figure 1A:
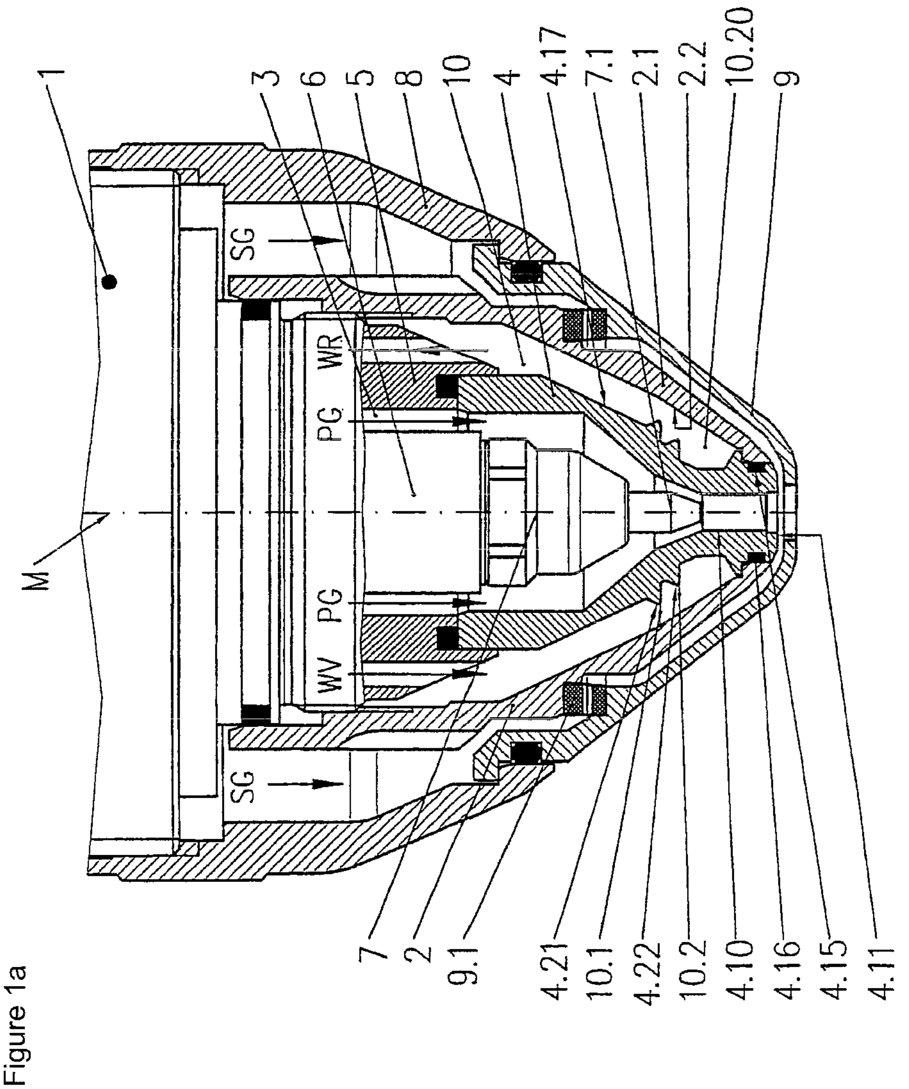
FIG. 1*a* shows a longitudinal section view through a plasma burner head with a plasma and secondary gas supply line with a nozzle in accordance with a particular embodiment of the present invention.
Figure 1B:
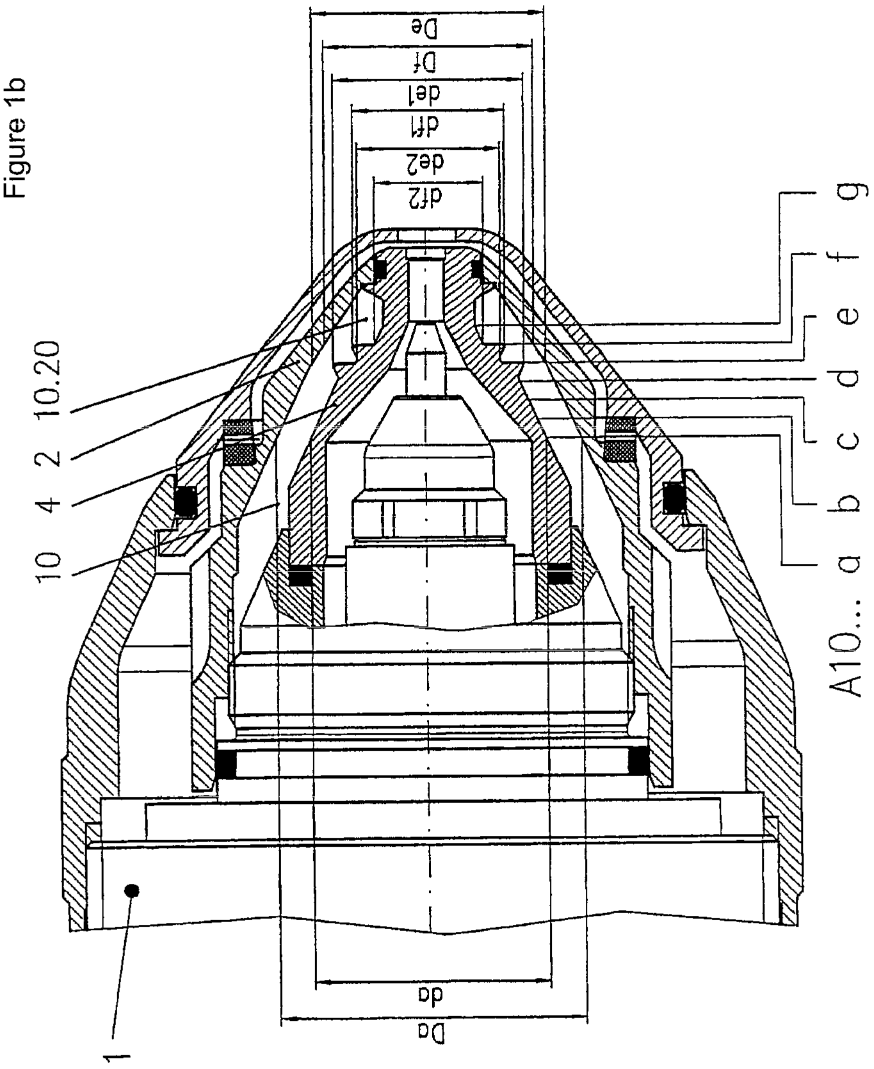
FIG. 1*b* shows the longitudinal section view of FIG. 1*a* with dimensions and section planes labelled.
Figure 2:
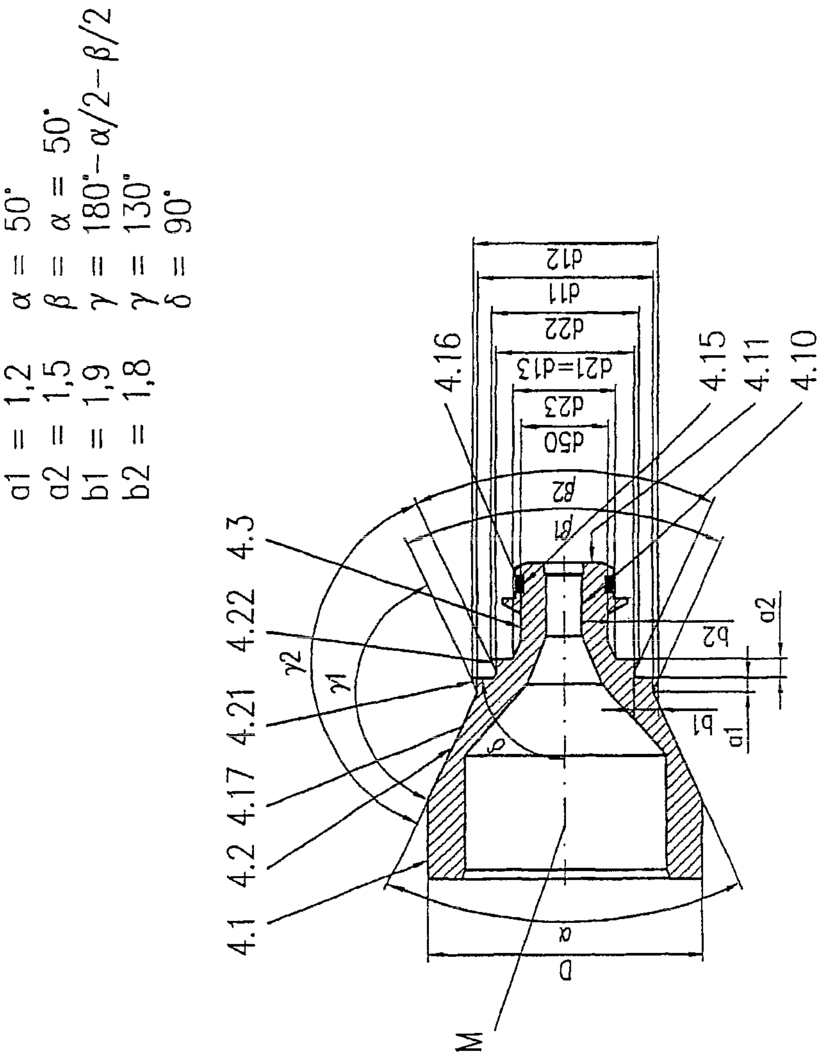
FIG. 2 shows an individual illustration of the nozzle of FIG. 1*a* in a longitudinal section view.

The plasma burner head 1 shown in FIGS. 1*a*, 1*b* and 2 has an electrode quill 6, with which it holds an electrode 7 with an electrode insert 7.1—via a thread (not shown) in the present case. The electrode 7 is designed as an electrode holder with a pointed electrode insert 7.1 made of tungsten. For the plasma burner, it is, for example, possible to use an argon/hydrogen mixture as the plasma gas. A nozzle 4 is held by a cylindrical nozzle bracket 5. A nozzle cap 2, which is attached to the plasma burner head 1 by means of a thread, immobilises the nozzle 4 and forms a coolant chamber 10 with it. The coolant chamber 10 is sealed between the nozzle 4 and the nozzle cap 2 by a seal implemented with an O-ring 4.16, which is located in a groove 4.15 in the nozzle 4. The nozzle 4 has a first section 4.17, the outer surface 4.2 of which tapers in the shape of a cone in the direction of the nozzle tip at an angle $\alpha$, except for two deflection sections 4.21 and 4.22 which extend in the shape of a cone in the direction of the nozzle tip at an angle $\beta=\beta_1=\beta_2$. The nozzle cap 2 comprises a section 2.1 adjacent to the first section 4.17, the internal surface 2.2 of which likewise tapers substantially in the shape of a cone.

A coolant, water for example, or water with antifreeze added, flows through the coolant chamber 10 from a coolant supply line WV to a coolant return line WR, the lines being arranged so as to be offset by 180°. In prior art plasma burners, it is repeatedly found that the nozzle overheats in the region of the nozzle bore 4.10. This is manifested by a discoloration of the copper of the nozzle after a short period of operation. The effect is particularly pronounced when the liquid-cooled plasma burner is operated indirectly. In this case, even at currents of 40 A, major discoloration already occurs after only a short time (5 minutes). Likewise, the sealing point between the nozzle and the nozzle cap is overloaded, which leads to damage to the O-ring 4.16 and thus to leaks and the escape of coolant. Studies have shown that this effect occurs in particular on the side of the nozzle facing the coolant return line WR. It is believed that the coolant insufficiently cools the region subjected to the highest thermal load, namely the nozzle bore 4.10 of the nozzle 4, because the coolant flows inadequately through the part 10.20 of the coolant chamber 10 closest to the nozzle bore and/or does not reach it at all, in particular on the side facing the coolant return line WR. The creation of the regions 10.1 and 10.2 in the coolant chamber 10 delimited by the nozzle 4 and the nozzle cap 2, which guide the direction of flow of the coolant outwards in the direction of the nozzle cap before it flows into the region 10.20 of the coolant chamber 10 surrounding the nozzle bore 4.10, improves the cooling effect considerably. Thanks to the creation of the regions 10.1 and 10.2, no discoloration of the nozzle in the region of the nozzle bore 4.10 occurred, even after more than an hour of operation. Nor did any leaks occur any more between the nozzle 4 and the nozzle cap 2, and the O-ring 4.16 was not overheated. It is believed that when the coolant flows to the nozzle tip through the regions 10.1 and 10.2 in the coolant chamber 10, it is deflected towards the nozzle cap 2, and the gap between the nozzle 4 and the nozzle cap 2 is reduced, causing the coolant to swirl more and the flow rate of the coolant to be increased. In addition, it would appear that the coolant is prevented from flowing back before it passes the greater part of the coolant chamber 10.20 around the nozzle bore 4.10, so that a more effective transfer of heat between the nozzle 4 and the coolant is achieved. The coolant is prevented from flowing back prematurely from the region 10.20 of the coolant chamber 10 by the sudden sharp reduction in the gap between the nozzle 4 and the nozzle cap 2 from the region 10.20 to the narrowed region 10.2 of the coolant chamber 10, since the region 10.2 forms an impact edge for the coolant.

Figure 1C:
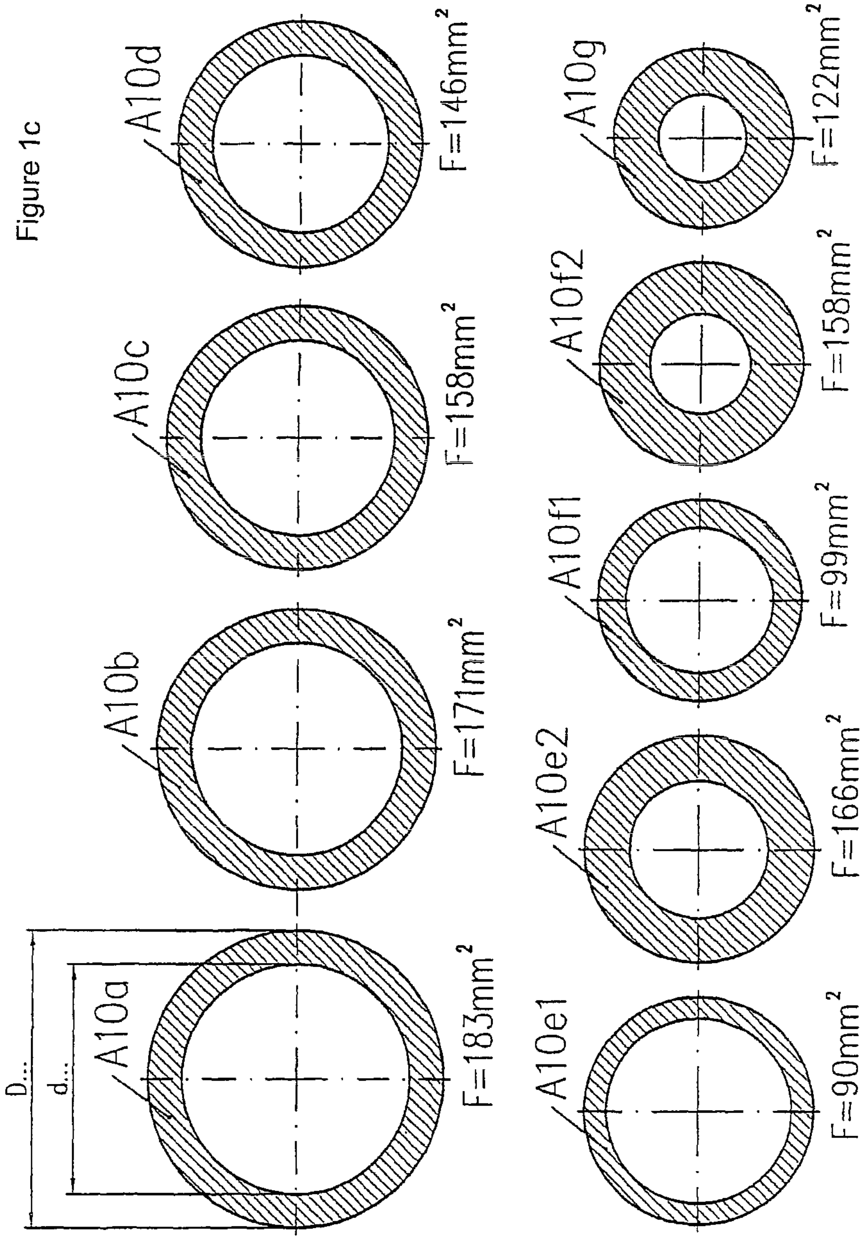
FIG. 1*c* shows illustrations of areas of a coolant chamber in the various section planes.

The location, the area F and the shape of the circular annular surface A10*a* to A10*g* of the coolant chamber 10 are shown in FIGS. 1*b* and 1*c*. From those, it is clear that the area F of the circular rings in the first section 4.17 first drops linearly from 183 $mm^2$ (A10*a*) to 146 $mm^2$ (A10*d*) at 8 $mm^2$ per 1 mm along the centre axis M of the nozzle, before falling more sharply to 90 $mm^2$ at 37 $mm^2$ per 1 mm along the centre axis M in the region 10.1 (A10*e*1). After that, the area F increases sharply to 166 $mm^2$ (A10*e*2) and reaches a larger size than before its reduction in the region 10.1 (A10*d*). The same also applies to the region 10.2.

In addition, the plasma burner head 1 is equipped with a nozzle cover guard bracket 8 and a nozzle cover guard 9. A secondary gas SG, which surrounds the plasma jet, flows through this region. The secondary gas SG flows through a secondary gas line 9.1, which can cause it to rotate.

FIG. 2 shows the nozzle 4 of FIGS. 1*a* and 1*b* in an individual illustration in a longitudinal section view; it has a second section with a cylindrical outer surface 4.1 for receiving in the nozzle bracket 5. In addition, it has a first section with one outer surface 4.2 which tapers in the shape of a cone substantially in the direction of the nozzle tip at an angle α and a second section with a substantially cylindrical outer surface 4.3. The outer surface 4.2 has two deflection sections 4.21 and 4.22, which extend in the shape of a cone in the opposite direction to the outer surface 4.2 tapering in the shape of a cone. In addition, the nozzle 4 has a groove 4.15 for an O-ring 4.16.

The key dimensions of the nozzle 4 are:

D=22 mm
a1=1.5 mm
a2=1.5 mm
b1=1.9 mm
b2=1.8 mm
α=50°
β1=β2=50°
γ=130°
δ=90°
d11=14.7 mm
d12=10.9 mm
d13=d21=11 mm
d22=11.8 mm
d23=12 mm
d51=7 mm.

In this embodiment, the angles α and β1 and also β2 are equal; similarly, the dimensions a1 and a2 are equal.

FIGS. 3*a* to 3*d* show a plasma burner head comprising plasma and secondary gas supply lines with a nozzle in accordance with a further particular embodiment of the present invention. A plasma burner head 1 has an electrode quill 6, with which it holds an electrode 7 with an electrode insert 7.1—via a thread (not shown) in the present case. The electrode 7 is designed as an electrode holder with a pointed electrode insert 7.1 made of tungsten. For the plasma burner, it is, for example, possible to use an argon/hydrogen mixture as the plasma gas. A nozzle 4 is held by a cylindrical nozzle bracket 5. A nozzle cap 2, which is attached to the plasma burner head 1 by means of a thread, immobilises the nozzle 4 and forms a coolant chamber 10 with it. The coolant chamber 10 is sealed by a metal seal between the nozzle 4 made of copper and the nozzle cap 2 made of brass. A metal seal in this case only means that the seal between the nozzle and the nozzle cap in the front region of the burner is not made by an O-ring, but rather by pressing two metal components together. The nozzle 4 has a first section 4.17, the outer surface of which tapers in the shape of a cone in the direction of the nozzle tip 4.11 at an angle α, except for three deflection sections 4.21, 4.22 and 4.23 which extend in the shape of a cone in the direction of the nozzle tip 4.11 at an angle β=β1=β2. The nozzle cap 2 comprises a section 2.1 adjacent to the first section 4.17, the internal surface 2.2 of which likewise tapers substantially in the shape of a cone. A coolant, water for example, or water with antifreeze added, flows through the coolant chamber 10 from a coolant supply line WV to a coolant return line WR, which are arranged so as to be offset by 180°.

Figure 3A:
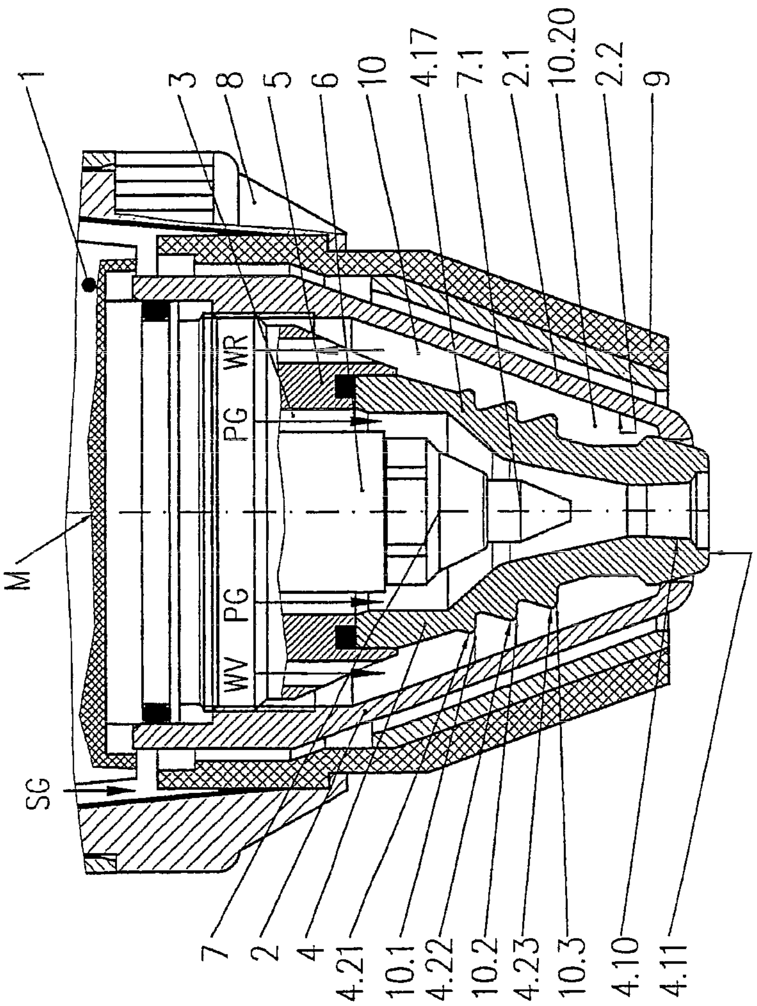
FIG. 3*a* shows a longitudinal section view through a plasma burner head comprising a plasma and secondary gas supply line with a nozzle in accordance with a further particular embodiment of the present invention.
Figure 3B:
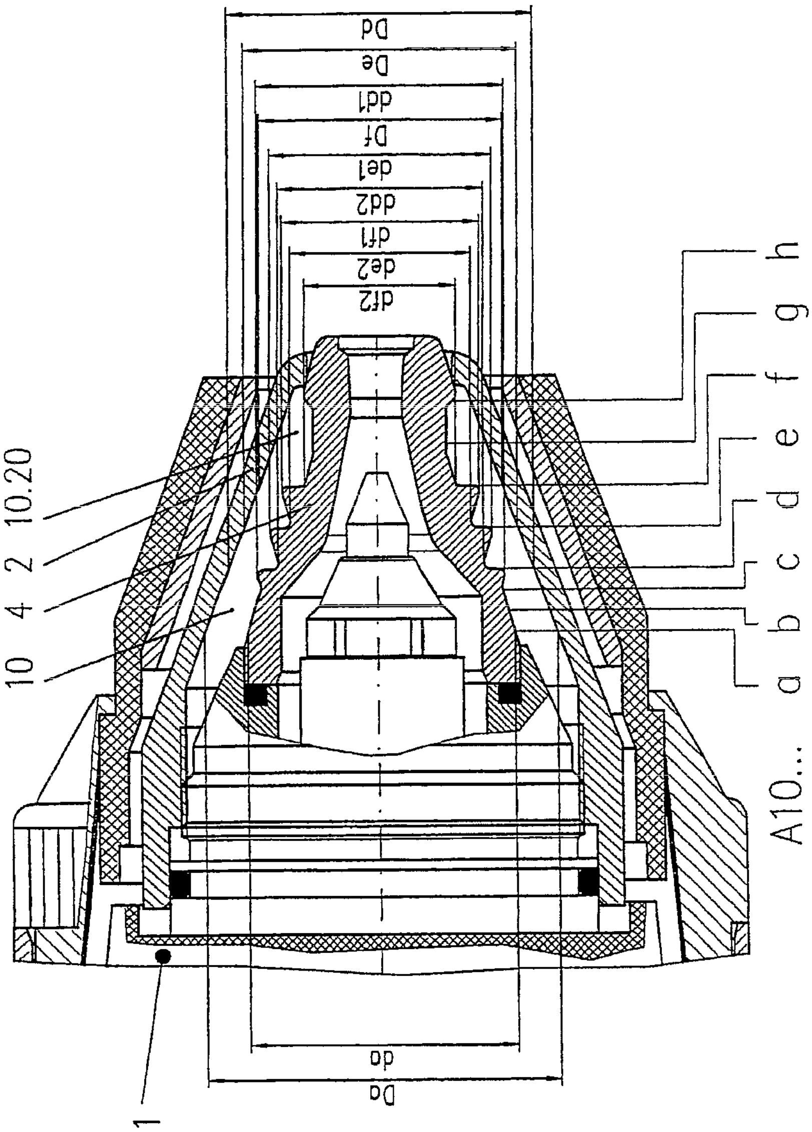
FIG. 3*b* shows the longitudinal section view of FIG. 3*a* with dimensions and section planes labelled.
Figure 3C:
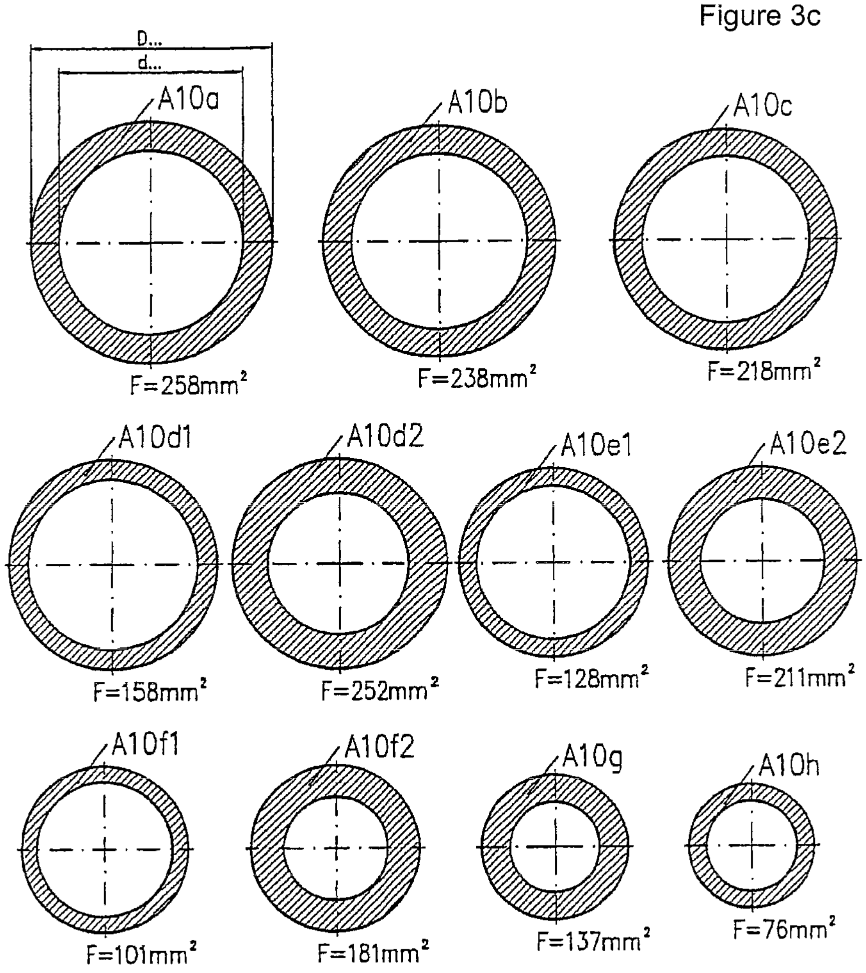
FIG. 3*c* shows illustrations of areas of a coolant chamber in the various section planes.

The location, the area F and the shape of the circular annular surface A10*a* to A10*i* of the coolant chamber 10 are shown in FIGS. 3*b* and 3*c*. It can be seen from these that the area F of the circular rings in the conical region first drops linearly from 258 $mm^2$ (A10*a*) to 218 $mm^2$ (A10*c*) along the burner axis M in the region 10.1 to 158 $mm^2$ (A10*d*1). After that, the area F increases sharply to 252 $mm^2$ (A10*d*2) and reaches a larger size than before its reduction in the region 10.1 (A10*c*). The same also applies to the regions 10.2 and 10.3.

In addition, the plasma burner head 1 is equipped with a nozzle cover guard bracket 8 and a nozzle cover guard 9. A secondary gas SG, which surrounds the plasma jet, flows through this region.

Figure 3D:
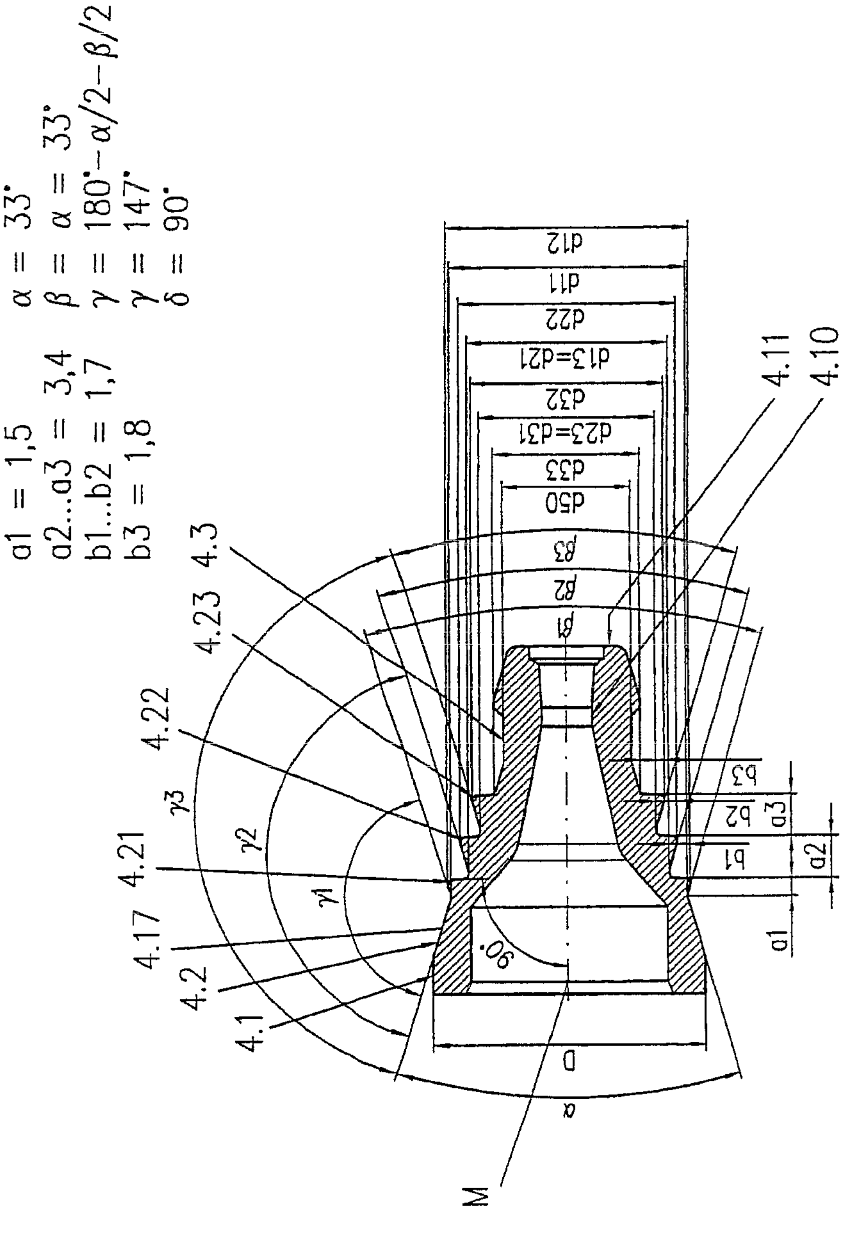
FIG. 3*d* shows an individual illustration of the nozzle of FIG. 3*a* in a longitudinal section view.

FIG. 3*d* once again shows the nozzle 4 of FIG. 3*a*, but in an individual illustration. It has a second section with a cylindrical outer surface 4.1 to be received in the nozzle bracket 5, a first section with an outer surface 4.2 tapering in the shape of a cone in the direction of the nozzle tip 4.11, and a third section with a substantially cylindrical outer surface 4.3, which surrounds the nozzle bore 4.10. The outer surface 4.2 has three deflection sections 4.21, 4.22 and 4.23, which, in sections, extend in the shape of a cone in the opposite direction to the outer surface 4.2, which as a whole tapers in the shape of a cone. The key dimensions of the nozzle are:

D=22 mm
a1=3.4 mm
a2=a3=1.7 mm
b1=3.4 mm
b2=b3=1.7 mm a=33°

β1=β2=β3=33°

γ=147°

δ=90° d11=19.2 mm d12=19.7 mm d13=d21=16.3 mm d22=17.7 mm d23=d31=14.3 mm d32=15.7 mm d33=12 mm d50=10:5 mm.

Figure 4:
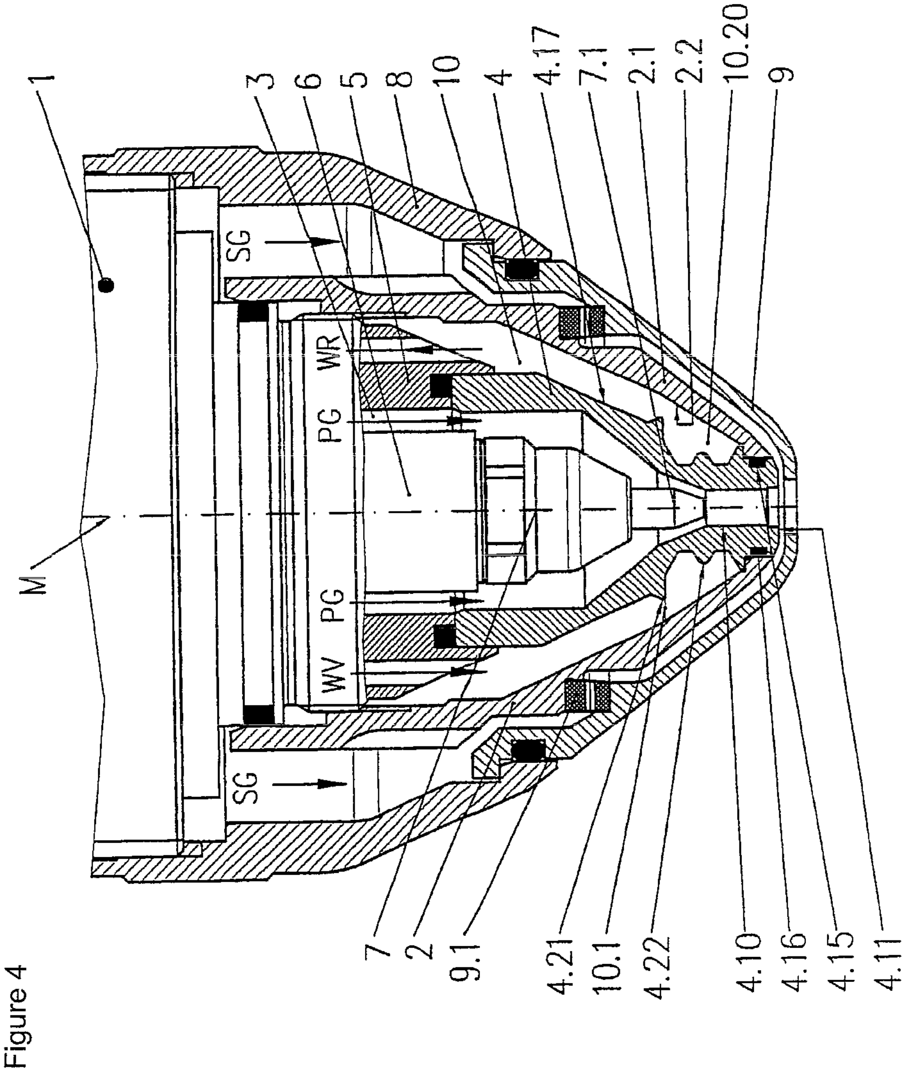
FIG. 4 shows a longitudinal section view through a plasma burner head comprising a plasma and secondary gas supply line with a nozzle in accordance with a further particular embodiment of the present invention.

FIG. 4 shows the plasma burner head of FIG. 1*a* with a different nozzle. The creation of a region 10.1 in the coolant chamber 10 delimited by the nozzle 4 and the nozzle cap 2, which runs in the shape of a cone in the direction of the nozzle tip 4.11 and which guides the direction of the coolant outwards in the direction of the nozzle cap 2 before it flows into the region 10.20 of the coolant chamber 10 surrounding the nozzle bore 4.10, improves the cooling effect considerably. In addition, the region 10.20 is narrowed here by a peripheral lug of the nozzle 4 and is divided into two regions. At the same time, the surface of the nozzle 4 around the nozzle bore 4.10 which conducts the heat away is enlarged in this way, which makes an additional contribution to improving the cooling.

Figure 5:
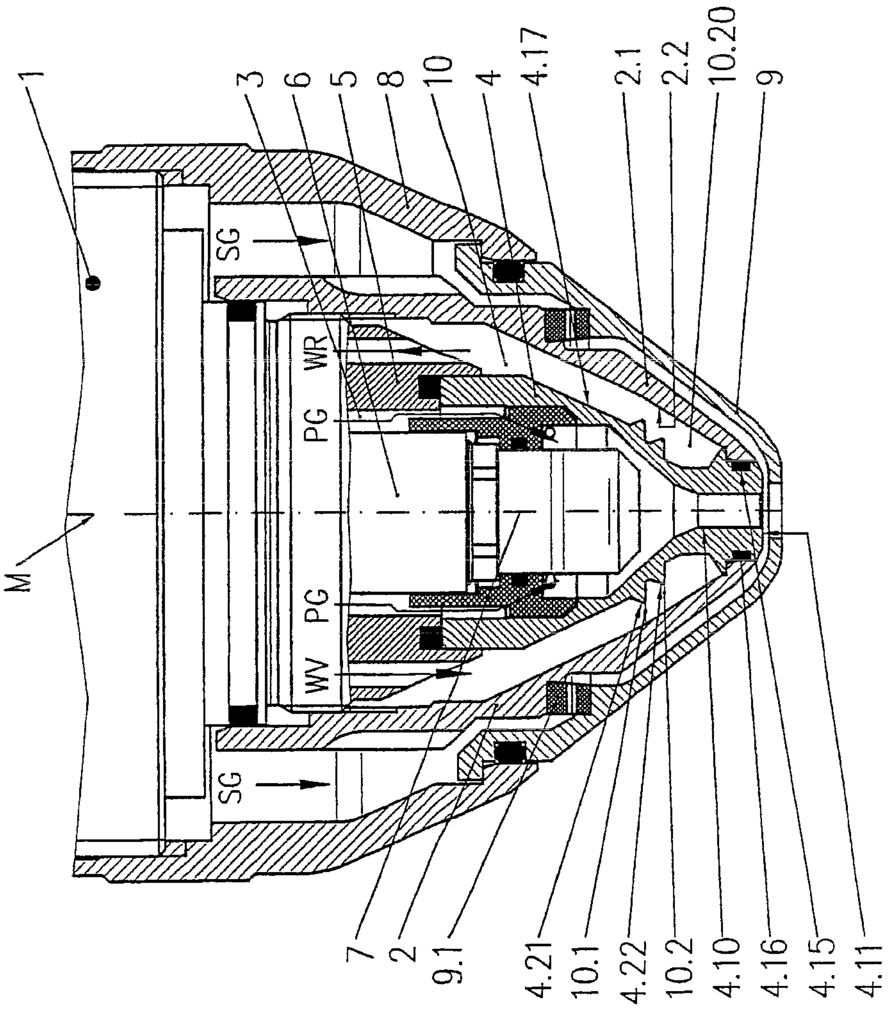
FIG. 5 shows a longitudinal section view through a plasma burner head comprising a plasma and secondary gas supply line with a nozzle in accordance with a further particular embodiment of the present invention.

FIG. 5 shows a further special embodiment of the plasma burner of the invention. similar to FIG. 1*a*. In this case, the plasma burner is provided with a flat-tip electrode 7 for oxygen-containing gases or nitrogen as the plasma gas. The coolant chamber 10 possesses the same features as those in FIG. 1*a*.

Figure 6:
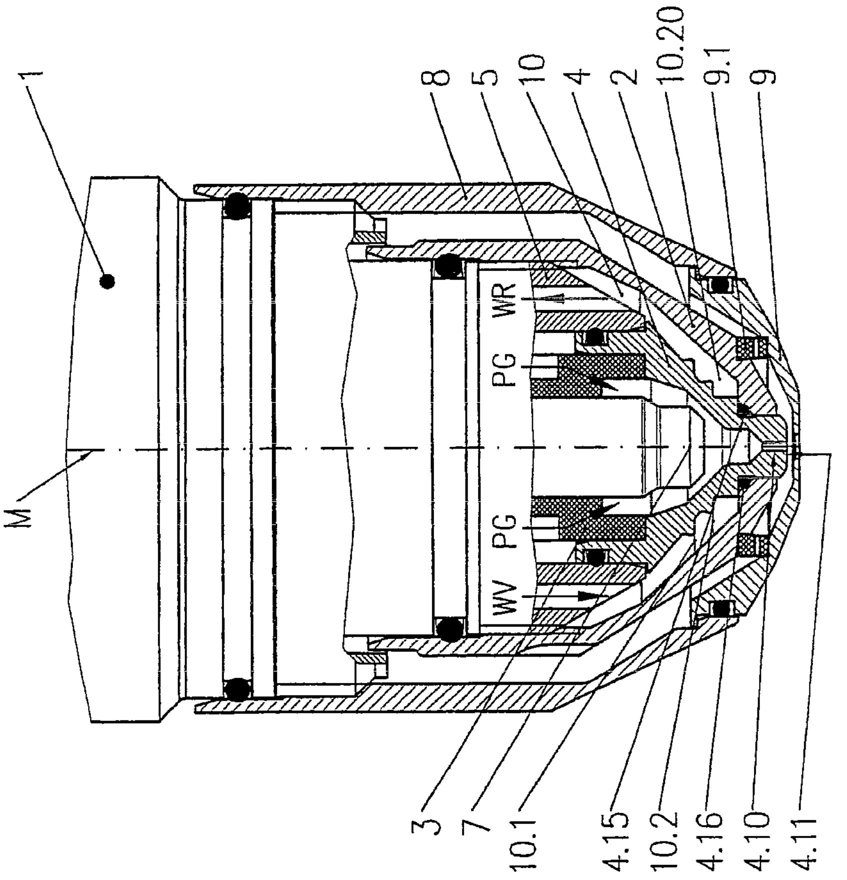
FIG. 6 shows a longitudinal section view through a plasma burner head comprising a plasma and secondary gas supply line with a nozzle in accordance with a further particular embodiment of the present invention.
Figure 6A:
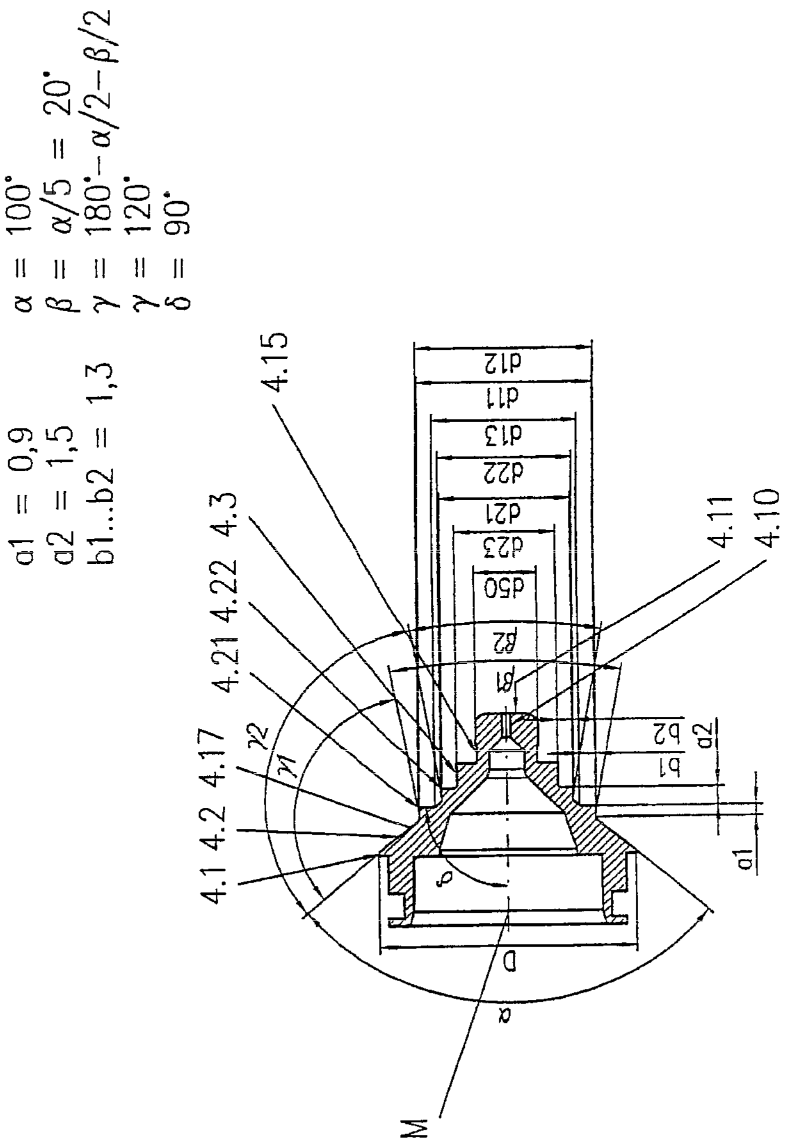
FIG. 6*a* shows an individual illustration of the nozzle of FIG. 5 in a longitudinal section view.

FIG. 6 likewise shows a plasma burner in accordance with a particular embodiment of the present invention for oxygen-containing gases or nitrogen as the plasma gas. The plasma burner and the nozzle 4 are not so acute-angled as those in FIG. 1*a*, but the coolant chamber possesses the same features as in FIG. 5. The associated nozzle 4 is illustrated in detail in FIG. 6*a*.

Figure 7:
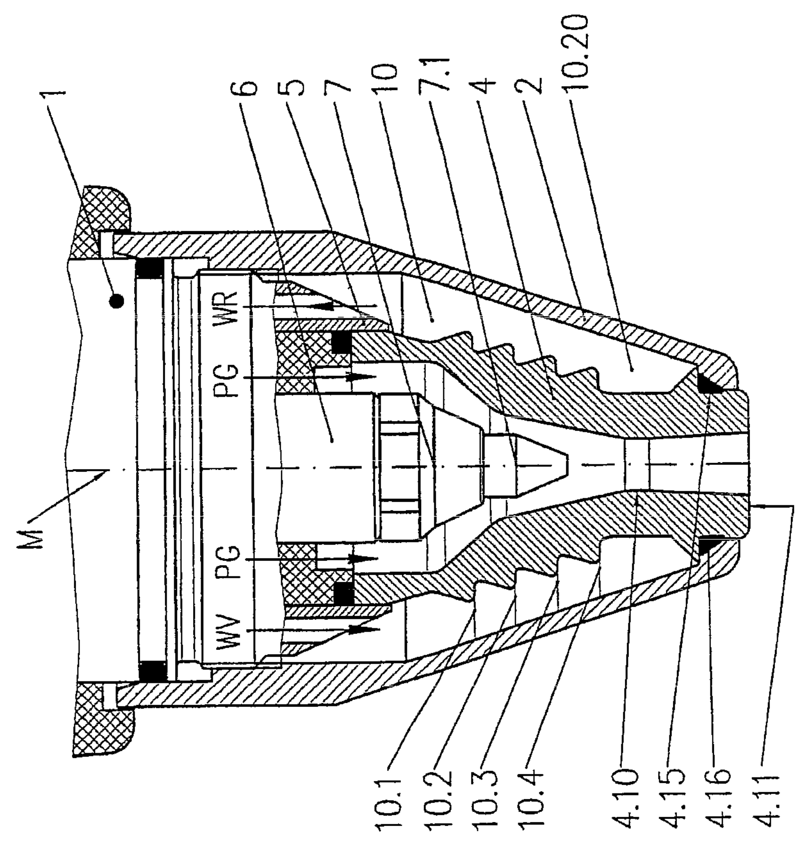
FIG. 7 shows a longitudinal section view through a plasma burner head, which can be operated indirectly, only with a plasma gas supply line with a nozzle in accordance with a further particular embodiment of the present invention.
Figure 8:
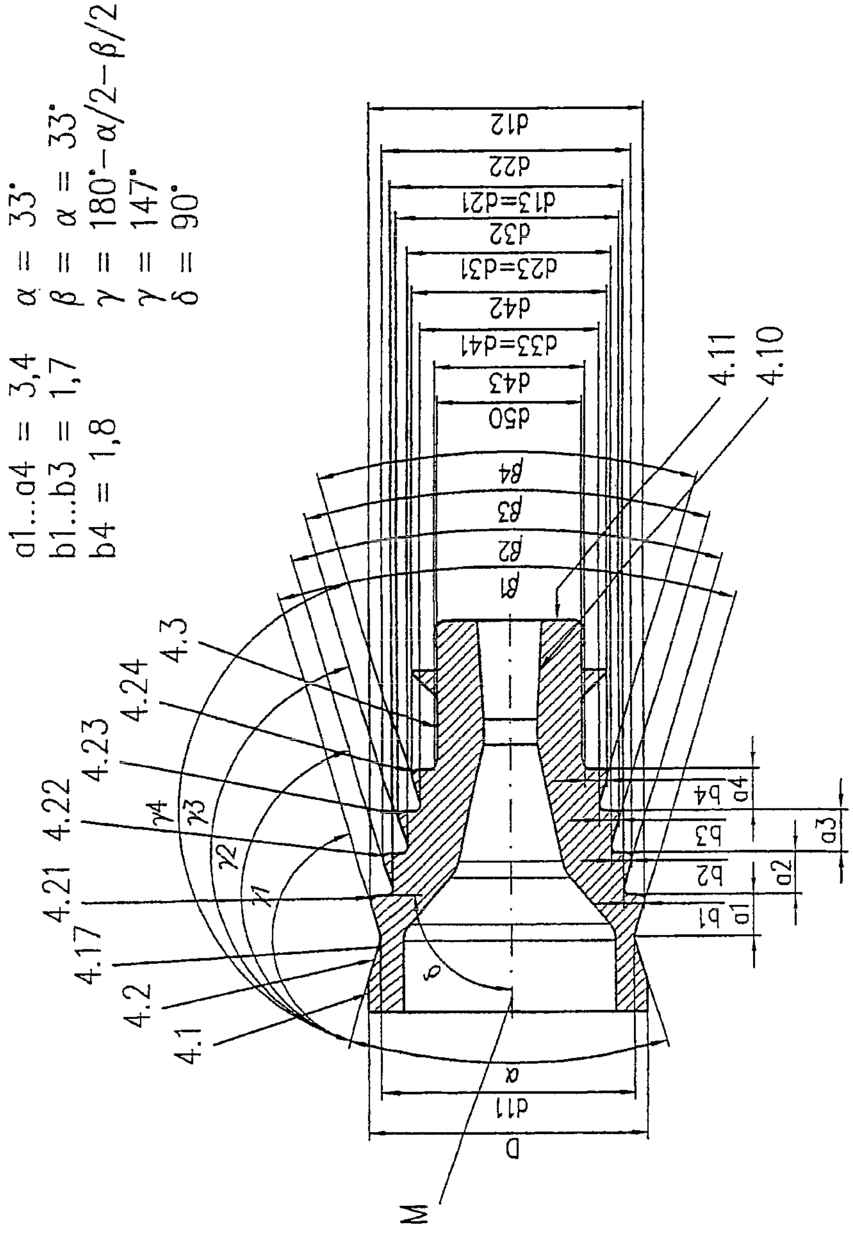
FIG. 8 shows an individual illustration of the nozzle of FIG. 7 in a longitudinal section view.
Figure 9:
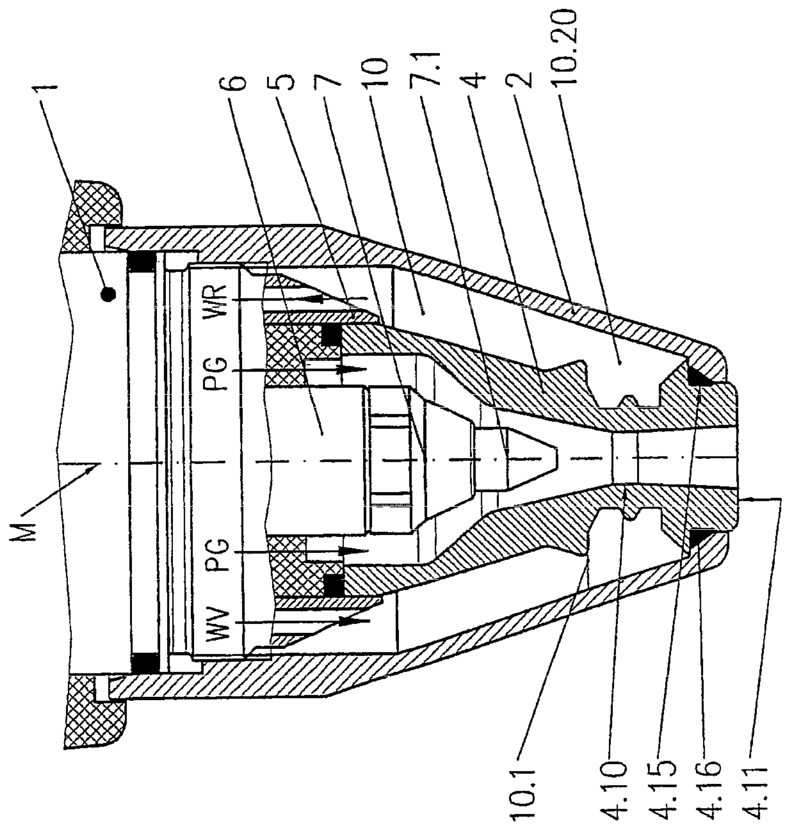
FIG. 9 shows a longitudinal section view through a plasma burner head, which can be operated indirectly, only with a plasma gas supply line with a nozzle in accordance with a further particular embodiment of the present invention.
Figure 10:
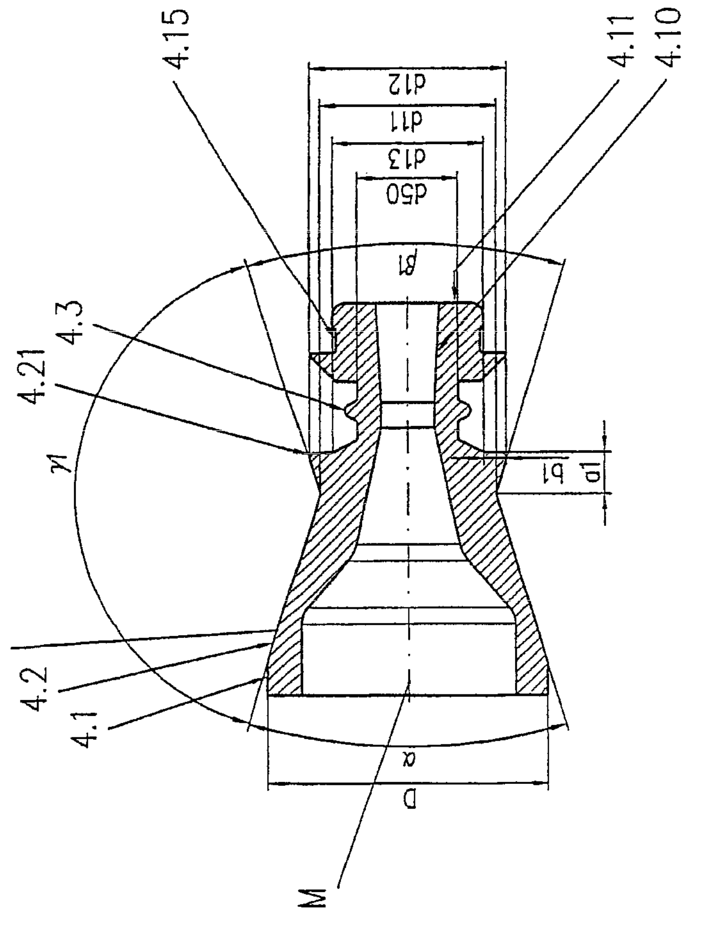
FIG. 10 shows an individual illustration of the nozzle of FIG. 9 in a longitudinal section view.
Figure 11:
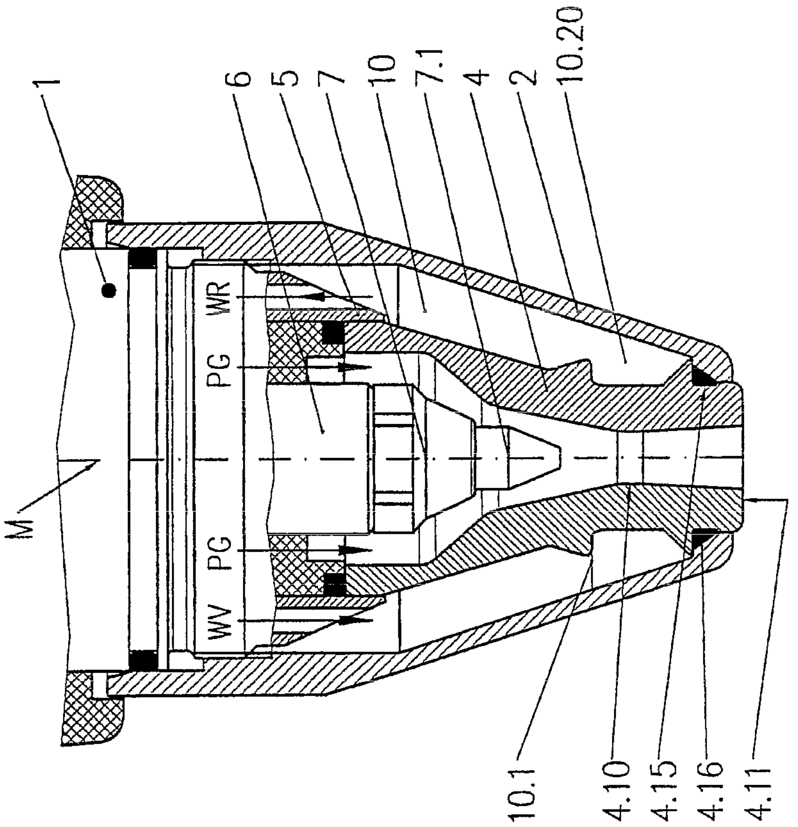
FIG. 11 shows a longitudinal section view through a plasma burner head, which can be operated indirectly, only with a plasma gas supply line with a nozzle in accordance with a further particular embodiment of the present invention.

FIGS. 7 to 11 show further particular embodiments of the plasma burner of the invention, but for the indirect operating mode for a mixture of $Ar/H_2$ as the plasma gas and without a cover guard bracket and nozzle cover guard. The nozzles for the indirect operating mode differ from those for the direct operating mode in that the conically extending part of the nozzle bore 4.10 located towards the nozzle tip 4.11 is considerably longer than the one in directly operated nozzles. The coolant chamber 10 again possesses the features of the invention. In FIGS. 9 and 11, the creation of a region 10.1 in the coolant chamber 10 delimited by the nozzle 4 and the nozzle cap 2, which runs in the shape of a cone in the direction of the nozzle tip 4.11 and which guides the direction of the coolant outwards in the direction of the nozzle cap 2 before it flows into the region 10.20 of the coolant chamber 10 surrounding the nozzle bore 4.10, improves the cooling effect considerably. FIG. 7 shows an arrangement with four such regions 10.1 to 10.4.

Figure 12:
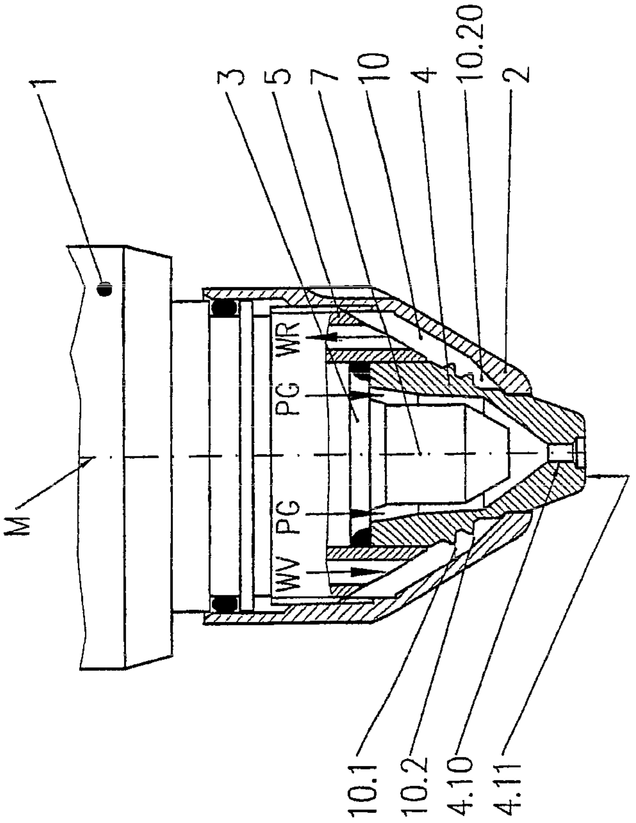
FIG. 12 shows a longitudinal section view through a plasma burner head only with a plasma gas supply line with a nozzle in accordance with a further particular embodiment of the present invention.

FIG. 12 shows a plasma burner for oxygen-containing gases or nitrogen as the plasma gas. The coolant chamber 10 has two regions 10.1 and 10.2 in the coolant chamber 10, which is delimited by the nozzle 4 and the nozzle cap 2 and runs in the shape of a cone in the direction of the nozzle tip 4.11 and guides the coolant outwards in the direction of the nozzle cap 2 before it flows into the region 10.20 of the coolant chamber 10 surrounding the nozzle bore 4.10, and improves the cooling effect considerably.

Figure 13:
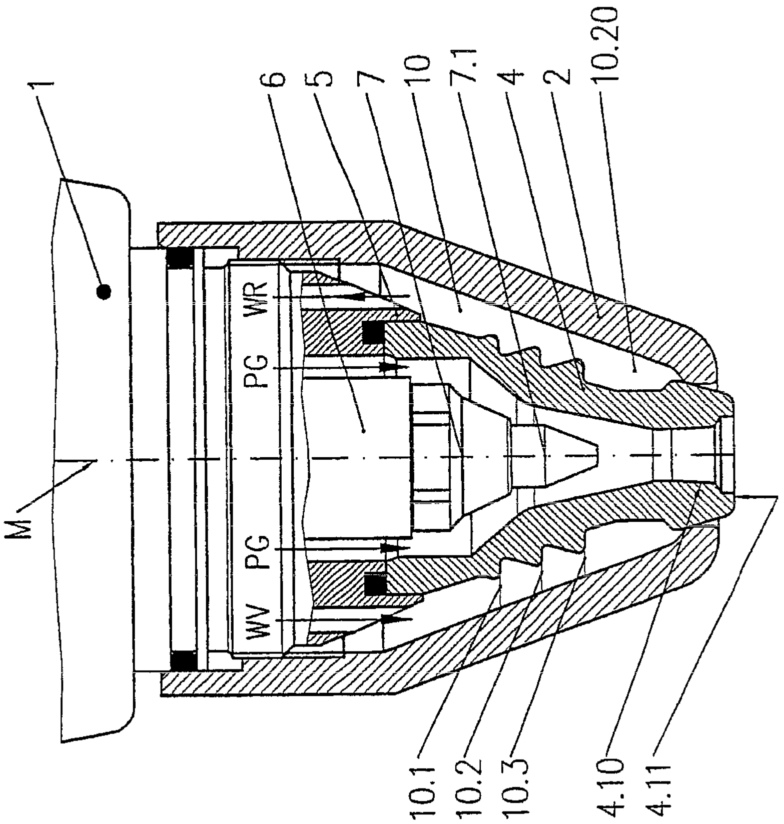
FIG. 13 shows a longitudinal section view through a plasma burner head only with a plasma gas supply line with a nozzle in accordance with a further particular embodiment of the present invention.

FIG. 13 shows a longitudinal section view through a plasma burner head with only a plasma gas supply line, i.e. without a nozzle cover guard bracket and nozzle cover guard, into which the nozzle of FIG. 3*d* likewise fits.

The features of the preferred embodiments of the invention disclosed in the present description, in the drawings and in the claims will be essential to implementing the invention in its various embodiments both individually and in any combination.

LIST OF REFERENCE NUMERALS

1 Plasma burner head
2 Nozzle cap
2.1 Section of the nozzle cap 2
2.2 Internal surface of the section 2.1
3 Plasma gas line
4 Nozzle
4.1 Cylindrical outer surface of the nozzle 4
4.2 Conical outer surface of the nozzle 4
4.3 Cylindrical outer surface of the nozzle 4
4.10 Nozzle bore
4.11 Nozzle tip
4.15 Groove
4.16 O-ring
4.17 First section of the nozzle 4
4.21, 4.22, 4.23, 4.24 Deflection sections
5 Nozzle bracket
6 Electrode quill
7 Electrode holder
7.1 Electrode insert
8 Nozzle cover guard bracket
9 Nozzle cover guard
9.1 Secondary gas line
10 Coolant chamber
10.1, 10.2, 10.3, 10.4 Narrowed portions of the coolant chamber 10
10.20 Part of the coolant chamber 10
A10*a* to A10*i* Circular annular surface of the coolant chamber 10
D Diameter of the nozzle 4
d11 to d41 Diameter of the nozzle 4
d12 to d42 Diameter of the nozzle 4
d13 to d43 Diameter of the nozzle 4
d51 Diameter of the nozzle 4
F Area
M Centre axis of the nozzle 4 or plasma burner head 1
PG Plasma gas
SG Secondary gas
WV Coolant supply line
WR Coolant return line
α Angle of the outer surface 4.2 of the nozzle 4
β1 to β4 Angles of the deflection sections 4.21 to 4.24
a1 to a4 Lengths of the deflection sections 4.21 to 4.24

The invention claimed is:

1. A nozzle for a liquid-cooled plasma burner, comprising:
a nozzle bore for a plasma gas jet to exit at a nozzle tip;
a first section, the outer surface of said first section tapering in the shape of a cone in the direction of the nozzle tip at an angle α; and
a plurality of deflection sections arranged on said outer surface, at least two of said deflection sections extending in the shape of a cone in the direction of the nozzle tip at angles β1, β2 to enhance cooling and coolant flow.

2. The nozzle as claimed in claim 1 wherein the angle α is in a range from 20° to 120°.

3. The nozzle as claimed in claim 2 wherein the angle β1, β2 is in a range from 20° to 120°.

4. The nozzle as claimed in claim 3 wherein said plurality of deflection sections extend in the shape of a cone at the same angle β1 or β2.

5. The nozzle as claimed in claim 3 wherein said plurality of deflection sections extend in the shape of a cone at different angles β1, β2.

6. The nozzle as claimed in claim 5 wherein the angles α and β1 or β2 differ by a maximum of 30°.

7. The nozzle as claimed in claim 5 wherein the angles α and β1 or β2 are equal in size.

8. The nozzle as claimed in claim 7 wherein an angle γ, which is formed by the outer surface of the first section, which tapers in the shape of a cone, and the outer surface of the or one of the deflection section(s), which extends in the shape of a cone, is between 60° and 160°.

9. The nozzle as claimed in claim 8 wherein an angle δ, which is formed by an edge of the or one of the deflection section(s), which is at the front relative to the nozzle tip, and the centre axis of the nozzle is between 75° and 105°.

10. The nozzle as claimed in claim 9 wherein the angle δ is 90°.

11. The nozzle as claimed in claim 8 wherein the length or lengths (a1, a2, . . . ) of the deflection sections(s) running parallel to the centre axis of the nozzle is or are in the range from 1 to 3 mm.

12. The nozzle as claimed in claim 11 wherein the lengths (a1, a2, . . . ) of the deflection section(s) running parallel to the centre axis of the nozzle are equal in size.

13. The nozzle as claimed in claim 8 wherein the length or lengths (b1, b2, . . . ) of the deflection sections(s) running perpendicular to the centre axis of the nozzle is or are in the range from 1 to 4 mm.

14. The nozzle as claimed in claim 13 wherein the lengths (h1, b2, . . . ) of the deflection section(s) running perpendicular to the centre axis of the nozzle are equal in size.

15. The nozzle as claimed in claim 14 wherein the nozzle has a second section with a cylindrical outer surface to be received in a nozzle bracket.

16. The nozzle as claimed in claim 15 wherein the nozzle has a third section with a substantially cylindrical outer surface, which is located immediately before the nozzle bore relative to the centre axis of the nozzle.

17. The nozzle as claimed in claim 15 wherein the nozzle has a third section with a substantially cylindrical outer surface, which is located at least partially opposite the nozzle bore relative to the centre axis of the nozzle.

18. The nozzle as claimed in claim 17 wherein there is a groove for an O-ring located in the vicinity of the nozzle tip.

19. An arrangement, comprising:

a nozzle having:

a nozzle bore for a plasma gas jet to exit at a nozzle tip; and a first section, the outer surface of said first section tapering in the shape of a cone in the direction of the nozzle tip at an angle α, a plurality of deflection sections arranged on said outer surface, at least two of said deflection sections extending in the shape of a cone in the direction of the nozzle tip at angles β1, β2 to enhance cooling and coolant flow; a nozzle cap; and wherein the nozzle cap and the nozzle form a coolant chamber which is in fluid connection with a coolant supply line and a coolant return line, and wherein, at least in the region of the first section of the nozzle, the nozzle cap has an internal surface tapering in the shape of a cone in the direction of the nozzle tip.

20. The arrangement as claimed in claim 19 wherein the area of the circular annular surface of the coolant chamber reduces in the direction of the nozzle tip along the centre axis of the nozzle in the at least one deflection section 1.5 to 8 times more quickly than before the at least one deflection section.

21. The arrangement as claimed in claim 20 wherein the area of the circular annular surface of the coolant chamber (10) in the direction of the nozzle tip along the centre axis of the nozzle immediately after the at least one deflection section is 1.5 to 8 times larger than the smallest area of the deflection section.

22. The arrangement as claimed in claim 21 wherein the circular annular surface of the coolant chamber in the direction of the nozzle tip along the centre axis of the nozzle immediately after the at least one deflection section jumps at least to the value it has immediately before the deflection section.

23. The arrangement as claimed in claim 22 wherein the coolant supply line and the coolant return line are arranged offset to one another by 180°.

24. A liquid-cooled plasma burner, comprising:

a coolant supply line;

a coolant return line;

a nozzle having:

a nozzle bore for a plasma gas jet to exit at a nozzle tip; and a first section, the outer surface of said first section tapering in the shape of a cone in the direction of the nozzle tip at an angle α, a plurality of deflection sections arranged on said outer surface, at least two of said deflection sections extending in the shape of a cone in the direction of the nozzle tip at angles β1, β2 to enhance cooling and coolant flow;

a nozzle cap; and wherein the nozzle cap and the nozzle form a coolant chamber which is in fluid connection with said coolant supply line and said coolant return line, and wherein, at least in the region of the first section of the nozzle, the nozzle cap has an internal surface tapering in the shape of a cone in the direction of the nozzle tip.

25. The plasma burner as claimed in claim 24, further comprising a secondary gas supply line and a nozzle cover guard.

* * * * *